United States Patent [19]

Newell

[11] 3,967,317
[45] June 29, 1976

[54] PREDISTORTION OF NRZ RECORDING CURRENT FOR VIDEO RECORDINGS

[75] Inventor: George F. Newell, Sutton, England

[73] Assignee: Westinghouse Electric Corporation, Pittsburgh, Pa.

[22] Filed: Dec. 24, 1974

[21] Appl. No.: 536,056

[52] U.S. Cl. .................................. 360/55; 360/66
[51] Int. Cl.² .......................................... G11B 5/02
[58] Field of Search .................. 360/55, 66, 25, 41, 360/26

[56] References Cited
UNITED STATES PATENTS

| | | | |
|---|---|---|---|
| 3,161,730 | 12/1964 | Collins | 360/55 |
| 3,376,566 | 4/1968 | Coccagna | 360/41 |
| 3,444,331 | 5/1969 | Brown, Jr. | 360/55 |
| 3,564,160 | 2/1971 | Temes et al. | 360/66 |
| 3,641,526 | 2/1972 | Bailey | 360/51 |

Primary Examiner—Alfred H. Eddleman
Attorney, Agent, or Firm—M. P. Lynch

[57] ABSTRACT

Undesirable interference beat patterns in the displayed video signals produced by a magnetic record-/reproduce head are substantially eliminated by appropriately changing the amplitude of the writing current to the head in synchronism with the polarity reversal to establish a current ratio which will result in uniform spacing between zero crossovers in the voltage output of the magnetic recording system.

2 Claims, 14 Drawing Figures

PREDISTORTION OF NRZ RECORDING CURRENT FOR VIDEO RECORDINGS

BACKGROUND OF THE INVENTION

Conventionally, video magnetic disc recording is achieved by modulating the frequency of zero crossovers in a square wave current fed to the recording head. Erasure is achieved by a direct current supplied to the head so as to drive the magnetic medium into saturation. When erasure is followed by recording with a square wave having virtually no even harmonics, it is found that even harmonics are present in the replayed signal. The result of this is that the second harmonic is frequency-modulated with twice the deviation of the fundamental component. If the spectrum width of the baseband signal is not small compared to the frequency of the recording squarewave, interference beat patterns can be present in the demodulated video output. Furthermore, because the replayed signal is conventionally fed via a frequency doubler circuit and low-pass filter to the output, the carrier frequency can be present at the output. This conventional magnetic recording process introduces even order distortion in the replayed signals.

SUMMARY OF THE INVENTION

It has been determined experimentally that in a non-return-to-zero (NRZ) recording of video signals, frequency-modulated onto a carrier, a precisely adjusted asymmetry in the spacing between alternate pairs of zero crossings in the carrier can cancel even harmonic distortion produced by the recording process. The magnetic recording process conventionally used for recording video signals introduces even order distortion in the reproduced signals. The invention disclosed herein with reference to the accompanying drawings identifies a technique for minimizing distortion by using a direct current shift of the writing signal applied to the record/reproduce head of the magnetic recording system.

DESCRIPTION OF THE DRAWINGS

The invention will become more readily apparent by the following exemplary description in connection with accompanying drawings.

DESCRIPTION OF THE PREFERRED EMBODIMENT

Figure 1:
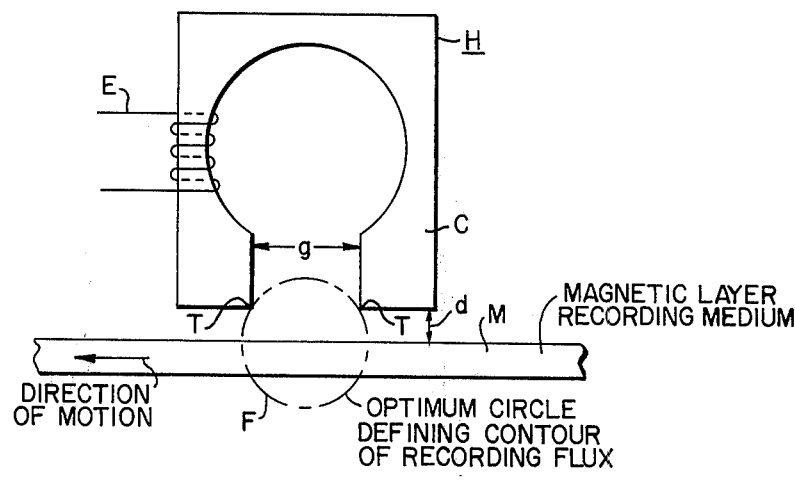
FIGS. 1 and 2 are schematic illustrations of a recording head and a magnetic medium.

Typically, if a recording head H of a magnetic recording/reproduction system is supplied with a square-wave writing current having optimum amplitude and near perfect symmetry, the output voltage produced during reproduction is distorted. The zero crossover points of the reproduced waveform are displaced so that the width of the positive-going half cycles are different from that of the negative-going half cycles. A possible explanation of this effect is given with reference to FIG. 1 which illustrates a head core C of the recording head H which has a recording head gap of a dimension g in operative association with a magnetic recording medium M of a thickness t. The magnetic recording medium M is spaced apart from the head core C by a distance d. The magnetic recording medium M may be, for example, a nickel-cobalt deposit on a metal disc which rotates so that the area of the surface that passes under the head gap g is an annular ring of a radius equal to the distance between the center of rotation and the head core C. Recording is achieved by supplying an alternating flux across the head gap g so as to leave the magnetic medium with a remanent magnetism alternately in the direction of motion and in the reverse direction. For optimum resolution of recording, the ampere-turns in the head coil E are adjusted to produce a flux such that the equi-strength contour separating flux strengths above the coercive force of the magnetic recording medium M and the flux of lower strength is a circle F centered at the medium M and contacting the tips T of the head core C.

Before recording, the magnetic recording medium M is erased by passing the medium under the head core C with a constant flux generated within the head core C by a constant direct current applied to the head coil E. This erasure establishes the magnetic recording medium M in one of two saturated states.

Figure 2:
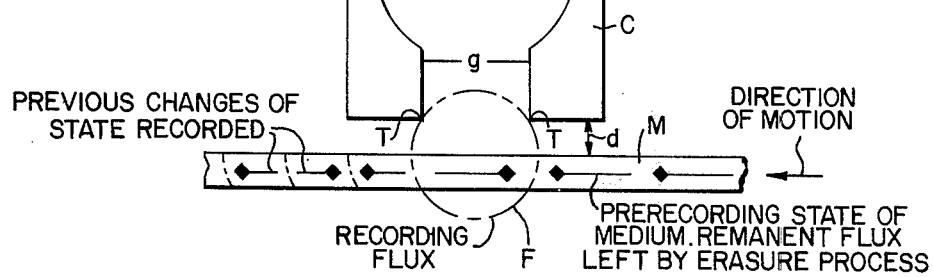

During the recording process, as illustrated in FIG. 2, that portion of the magnetic recording medium M that has passed under the head gap g has been saturated in alternate directions as shown by the arrows. The spacing between transitions of magnetic state represent the distances traveled by the magnetic recording medium between reversals in the polarity of the current supplied to the head coil E. The recording flux is alternately aided and opposed by the remanent field of the unrecorded track, and it is believed that this causes a displacement of the recording contour at the trailing edge of the head gap g. The transitions recorded when the fields produced by recording opposes the remanent magnetic field appear to be displaced in the direction opposite to that of the travel of the magnetic recording medium M.

Figure 3:
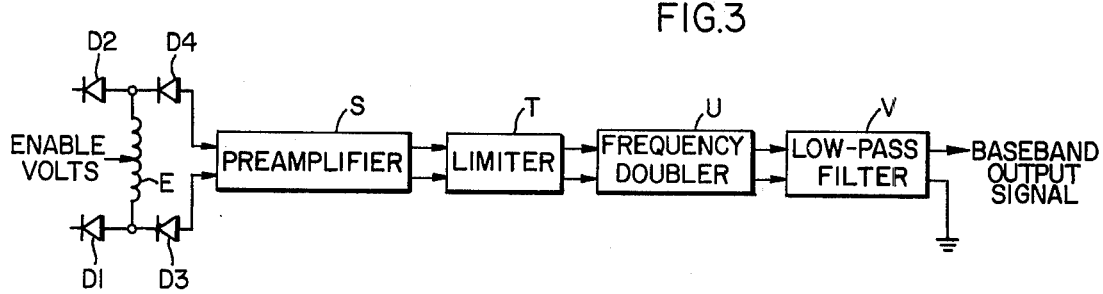
FIG. 3 is a block diagram illustration of circuitry for reproducing information from the magnetic medium of FIGS. 1 and 2.
Figure 4A:
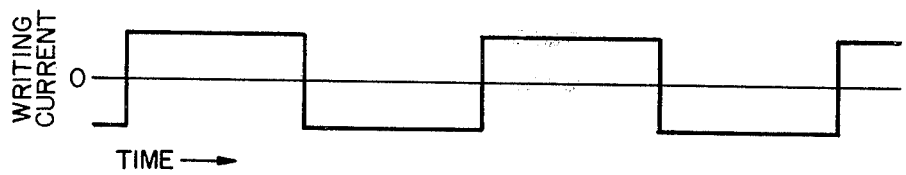
FIGS. 4A–4E are waveform illustrations typically encountered in a conventional magnetic record/reproduction system.
Figure 4B:
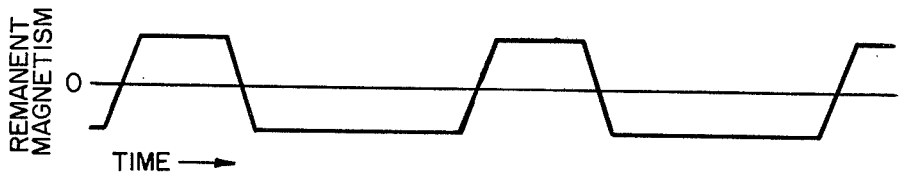
Figure 4C:
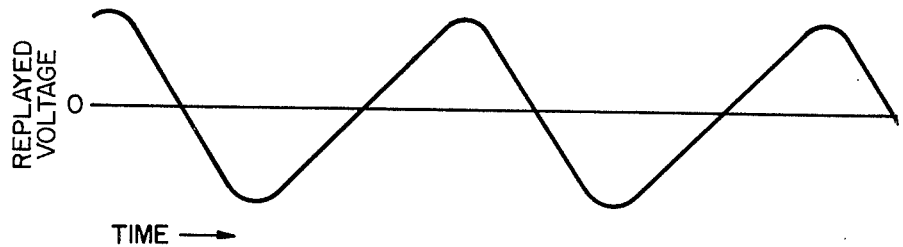
Figure 4D:
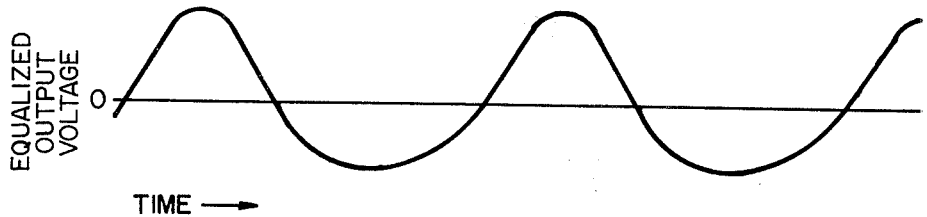
Figure 4E:
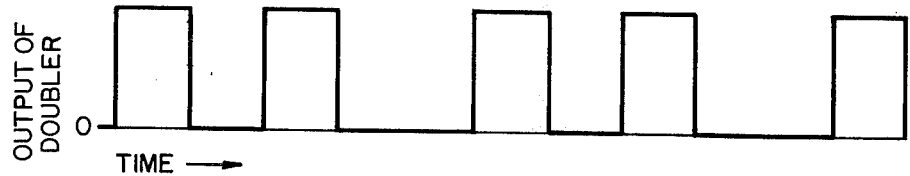

Typically the signal reproduced from the magnetic recording medium M is supplied through a frequency doubler circuit and a low pass filter to develop a baseband output signal for display. This is illustrated in FIG. 3 a block diagram representation of typical replay circuitry.

During replay the diodes D1 and D2 are open circuit and diodes D3 and D4 are close circuit. The emf developed in the head coil E as a result of flux changes caused by the movement of the magnetic medium M under the head H is supplied through preamplifier S, limiter T, frequency doubler U and low pass filter V to produce the baseband output signal.

There is illustrated in FIG. 4 the waveforms typically encountered in a conventional magnetic video recording reproduction system. The uniform recording squarewave current applied to the head coil E is illustrated as waveform 4A. Waveform 4B illustrates an asymmetrical magnetic state corresponding to the remanent magnetism. An asymmetry of slope in the bandwidth limited output voltage from the head H is illustrated in waveform 4C while waveform 4D illustrates a asymmetry of zero crossovers at the output of a preamplifier after equalization by integration. The frequency doubler stage produces uniform pulses commencing at each zero crossover of the waveform 4C, and the pairing of the pulses produces an undesirable component that can cause a visible interference pattern in the demodulated visual display. This undesirable pulse pattern is illustrated in waveform 4E. The waveform 4E contains a spectral component at the input frequency in addition to one at twice the input frequency and other harmonics of the input frequency. If the input frequency is sufficiently low, it will pass through the low pass filter and cause an interfering beat pattern. If the input frequency is now frequency modulated by the baseband signal, there will be three adjacent spectra: that associate with the fundamental, that with the second harmonic and that with the third harmonic. The spectra can overlap and cause beat patterns in the video output signal.

Figure 5A:
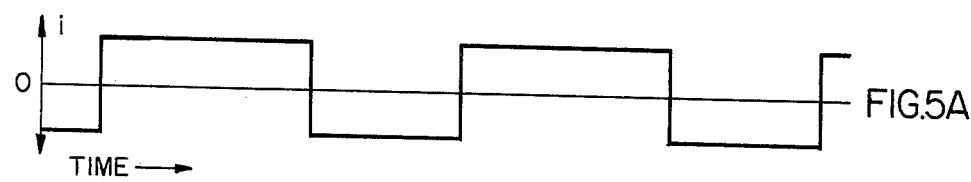
FIGS. 5A, 5B and 5C are waveforms illustrating reproduced output signals derived from the embodiments of FIGS. 1 and 2 when appropriate asymmetry is introduced into the writing current.
Figure 5B:
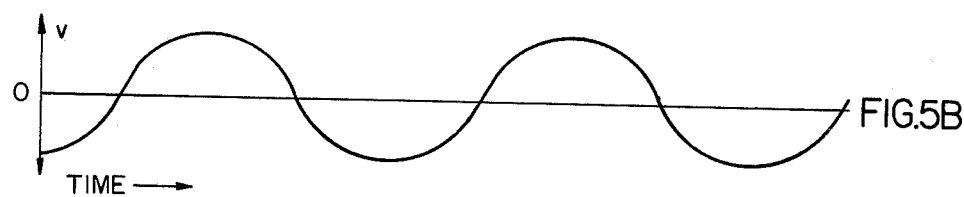
Figure 5C:
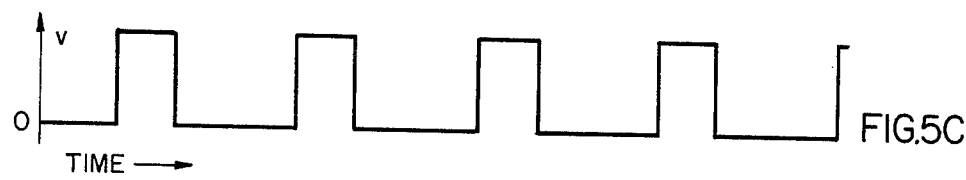

By appropriate asymmetry introduced into the writing current waveform as shown in waveform 5A of FIG. 5, it is possible to produce a replayed signal with uniform spacing between the zero crossover points as illustrated in waveform 5B. If the frequency doubler stage is now properly adjusted, it will produce uniformly spaced pulses, as illustrated in waveform 5C, at twice the input frequency. The passage of the waveform illustrated in FIG. 5C through the low pass filter provides an output signal proportional to the input frequency. This results in a faithful reproduction of the baseband or modulating signal which is substantially free of undesirable interference beat patterns in the displayed video signals.

Figure 7A:
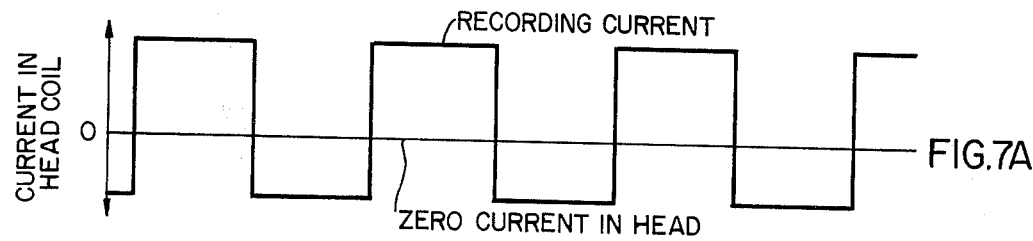
FIGS. 7A and 7B are waveform illustrations of the signals developed by the embodiment of FIG. 6.
Figure 7B:
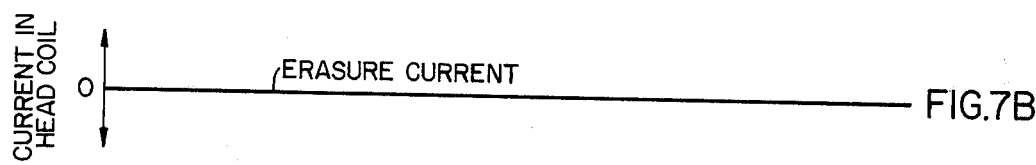
Figure 6:
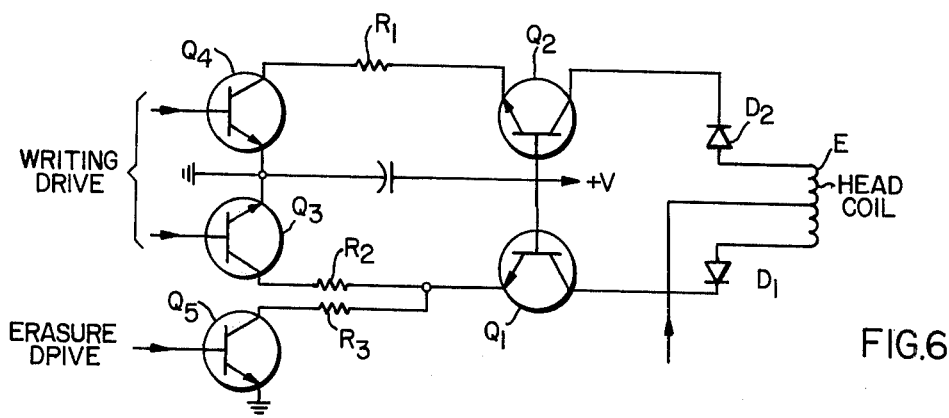
FIG. 6 is a schematic illustration of a typical embodiment for introducing the appropriate asymmetry in writing current as illustrated in FIGS. 5A–5C.

Referring to FIG. 6 there is schematically illustrated a circuit for implementing the appropriate asymmetry in the writing current waveform to minimize the interference beat patterns present in the output signal supplied for video display. The strength of the writing flux is proportional to the writing current. The contour of the equi-strength shown as circle F in FIGS. 1 and 2 will therefore have a diameter proportional to the amplitude of the alternating writing current. Therefore, by appropriately changing the amplitude of the writing current in synchronism with the polarity reversal of the writing current, the location of the intersection of the writing flux circle with the magnetic recording medium M can be changed for the two magnetic states. Current waveforms for writing and erasing are shown as waveforms 7A and 7B of FIG. 7.

During erasure, the transistor $Q_5$ is operative while $Q_3$ and $Q_4$ are inoperative. Erasure current is unidirectional and, using conventional current flow, the erasure current flows via one half of head coil E, through diode $D_1$, transistor $Q_1$, resistor $R_3$, and transistor $Q_5$. The amplitude of erasure current is determined by the magnitude of resistor $R_3$.

During record or write operation, transistor $Q_5$ is inoperative while transistors $Q_3$ and $Q_4$ are alternatively operative in each half cycle of the square wave recording or writing current. In this condition, the writing current alternates in direction from the center top of head coil E, via diode $D_1$, transistor $Q_1$, resistor $R_2$, and transistor $Q_3$ in one half cycle and via diode $D_2$, transistor $Q_2$, resistor $R_1$, and transistor $Q_4$ in the other half cycle. The magnitudes of the current in each half cycle are determined by the values of resistors $R_1$ and $R_2$.

Resistor $R_3$ is conventionally of smaller resistance value than resistors $R_1$ and $R_2$, which are conventionally of equal resistance. For this invention resistor $R_1$ is made to have less resistance than resistor $R_2$ so that the current flowing via resistor $R_1$ exceeds that flowing through resistor $R_2$. Resistor $R_1$ is adjusted so that the second harmonic of the current reproduced in the head coil E during replay is minimized to near zero magnitude.

What is claimed is:

1. A method of minimizing harmonic distortion in the replayed output signals from a magnetic record/reproduction system wherein a remanent magnetic field exists in the magnetic recording medium as a result of erasure of the medium, comprising the steps of:
supplying alternate half cycles of writing current to the recording head of said system, and
adjusting the amplitude of said writing current in synchronism with the polarity reversal of the alternate half cycles of said writing current to establish a current ratio between alternate half cycles of said writing current to produce uniform spacing between the replayed output signals from said magnetic record/reproduction system.

2. Apparatus for minimizing harmonic distortion in replayed output signals from a magnetic record/reproduction system wherein a remanent magnetic field exists in the magnetic recording medium has a result of erasure of the medium, comprising, first means for supplying alternate half cycles of writing current to the recording head of said system, and second means for adjusting the amplitude of said writing current in synchronism with the polarity reversal of the alternate half cycles of said writing current to establish a current ratio between alternate half cycles of said writing current to produce uniform spacing between the replayed output signals from said magnetic record/reproduction system.

* * * * *